April 18, 1933. T. G. JUNGERSEN 1,904,922
DUMP BODY OPERATING MECHANISM
Filed Jan. 27, 1930 2 Sheets-Sheet 1
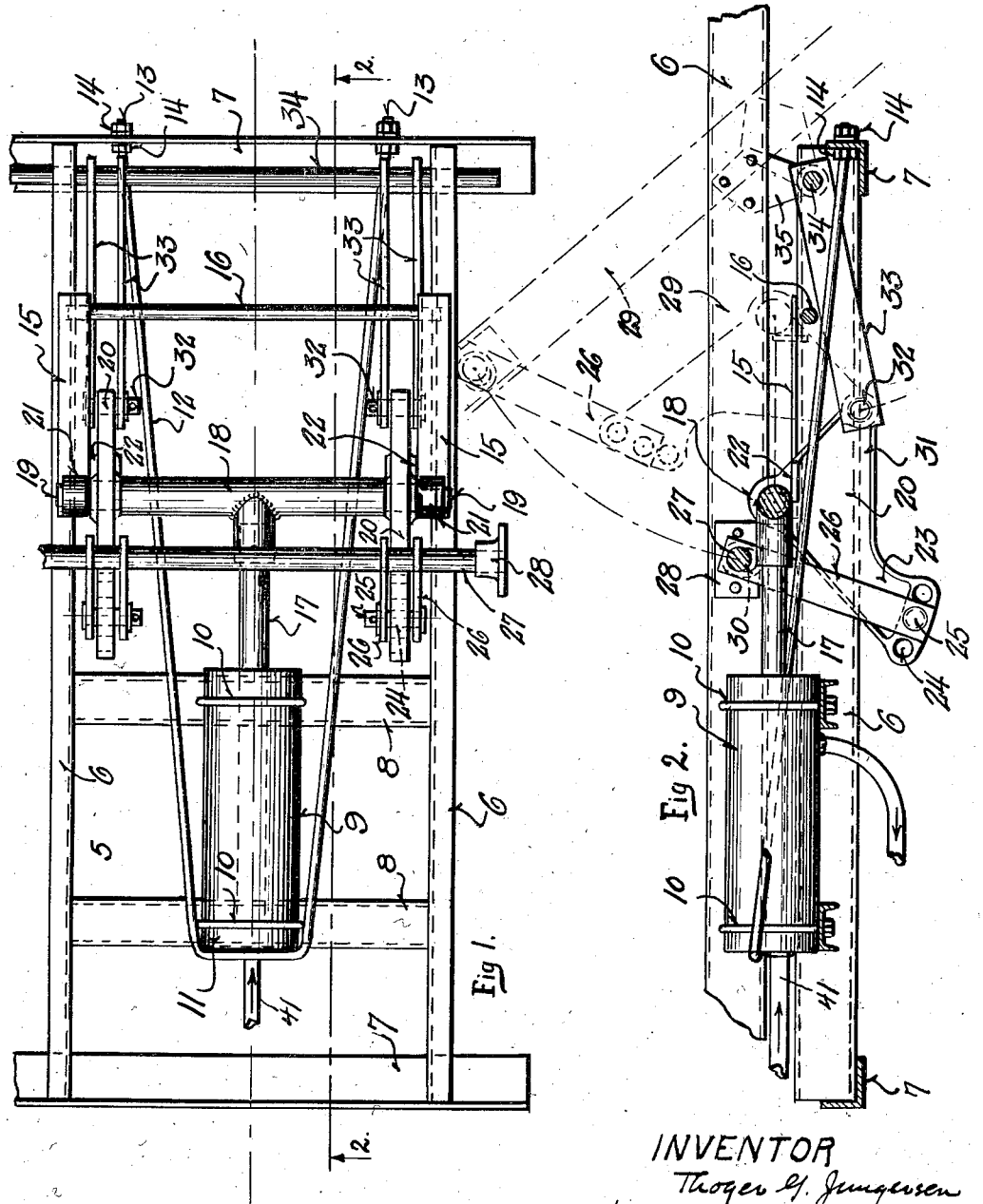
INVENTOR
Thoger G. Jungersen
by Quarles & French
Attorneys

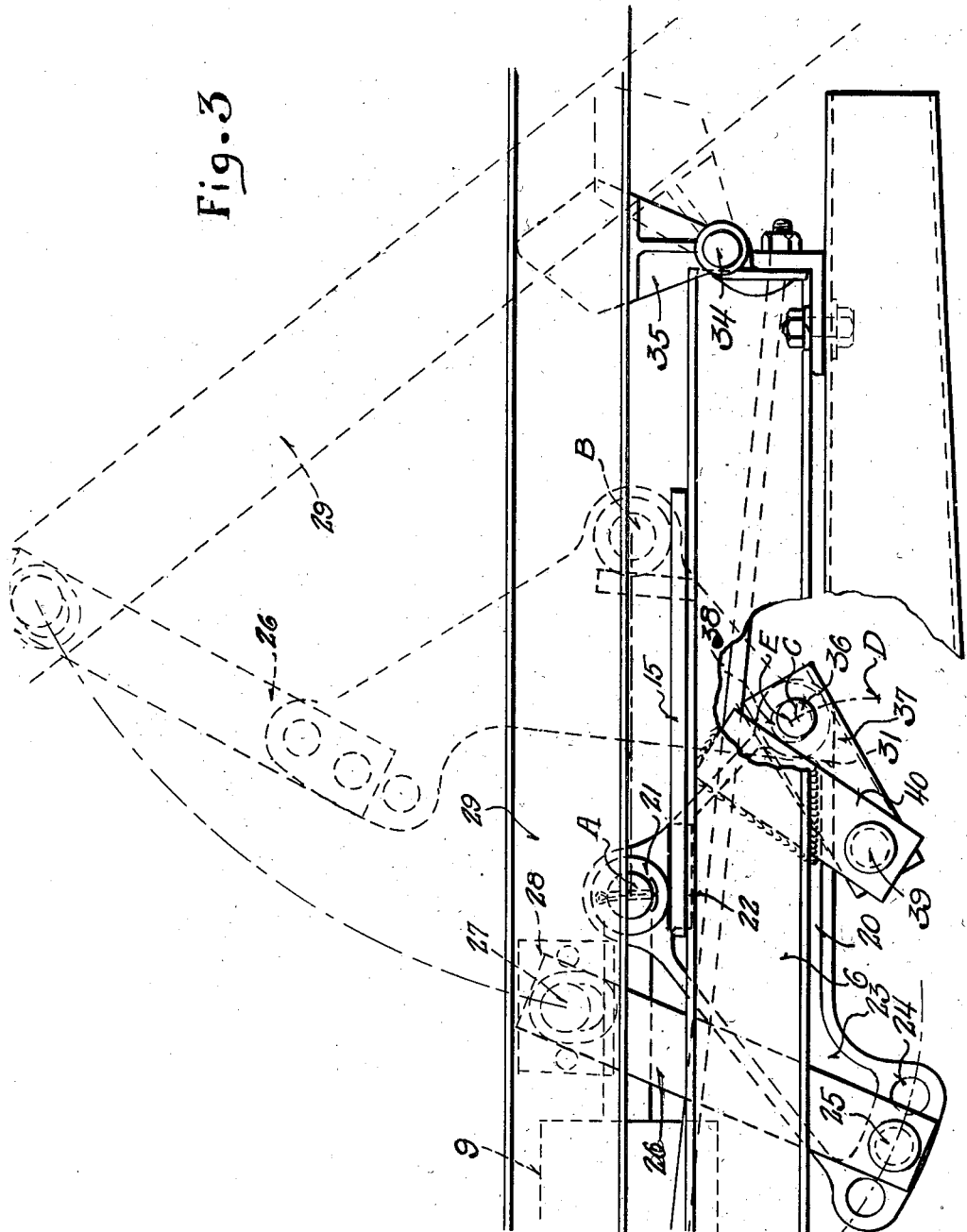

Patented Apr. 18, 1933

1,904,922

UNITED STATES PATENT OFFICE

THOGER G. JUNGERSEN, OF MILWAUKEE, WISCONSIN

DUMP BODY OPERATING MECHANISM

Application filed January 27, 1930. Serial No. 423,676.

The invention relates to hoisting mechanism for dumping bodies in trucks and more particularly to that type of hoisting mechanism operated by a source of fluid pressure.

One of the objects of the invention is to provide a simple and effective operating linkage between the fluid-operated piston and the dumping body which insures equalization of thrusting effort by the piston within the range of lift of the center of gravity of the dumping body.

A further object is to simplify and improve upon the structure shown and described in the prior United States Patent No. 1,260,559, dated March 26, 1918, to Charles I. Longnecker.

A further object of the invention is to provide a dumping mechanism including an hydraulically operated lever or levers connected by a lifting link or links wherein said link or links have a certain amount of play to prevent shocks from the body damaging the operating linkage.

A further object of the invention is to provide dumping mechanism whereby the tipping angle may be varied without shortening or lengthening the stroke of the operating linkage.

A further object of the invention is to provide a track for parts of the operating linkage and to maintain said tracks in alinement through the cooperation of the operating levers.

The invention further consists in the several features hereinafter set forth and more particularly defined by claims at the conclusion hereof.

In the drawings Fig. 1 is a plan view of dumping body mechanism embodying the invention, the dump body frame being omitted;

Fig. 2 is a detail sectional view taken on the line 2—2 of Fig. 1, with a part of the dump body frame shown;

Fig. 3 is a side elevation of the mechanism showing certain modifications, parts being broken away.

Referring to Figs. 1 and 2, the numeral 5 designates generally a supporting frame comprising longitudinally extending frame members 6 designed to fit between and rest upon and be secured to cross frame member 7 of the vehicle truck frame, said members 6 being connected by cross-pieces 8 welded or otherwise suitably secured to the members 7.

An hydraulic cylinder 9 is mounted on the cross-pieces 8 and secured thereto by U-bolts 10 and is braced to counteract the resistance of the piston 11 operating in said cylinder by a U-shaped brace 12 in the form of a tubular rod secured at its ends 13 to one of the cross frames 7 by bolts 14.

Plates 15 are welded to the top of the frame members 6 and form tracks and a stop rod and brace 16 is secured to and extends between said members 6 adjacent the outer ends of said tracks.

The piston 11 is connected by the usual piston-rod 17 to the medial portion of a crosshead or thrust-bar 18, said bar having spindle or shaft portions 19 at its end upon each of which a thrust lever 20 and a roller 21 is mounted. The rollers 21 ride on tracks 15 as the piston reciprocates the crosshead 18 and the tracks with their supporting frame are maintained in proper transverse alinement by lugs 22 on said levers 20 engageable with said tracks during the movement of said levers.

Each lever 20 has an arm 23 provided with a plurality of holes 24 for selectively receiving a pin 25 or other suitable fastening means for pivotal and thrust connection with a pair of links 26 which are pivotally connected at their other ends to a rod or bar 27 which is connected at its ends to suitable brackets 28 (one being shown) on the dumping body frame 29. One of the pivotal connections of these links has a certain amount of play to prevent shocks from the body injuring the linkage and I have shown this lost-motion connection here as formed by slots or elongated openings 30 in those ends of the links 26 connected with the bar 27. The holes 24 have their centers in the arc of a circle whose center is the center of the rod 27 so that while the adjustment of the links 26 relative to the levers 20 will vary the height and hence the angle of dumping tilt of the body, the stroke of the levers 20 under the action of the hydraulic operating means remains constant.

As shown in Figs. 1 and 2 the other arm 31 of each lever 20 is pivotally connected by a pin 32 to a pair of rigid links 33 and each pair of links is in turn pivotally anchored on a bar 34 secured at its ends in frame members 6 and also forming the fulcrum for the body frame 29 through the pivotal connection of hanger brackets 35 (one being shown) therewith.

In Fig. 3 the parts are similarly arranged and similarly referenced except for the forward link connection. In this construction it will be noted that instead of extending the connections between the lever arm 31 to fulcrum bar 34 that the lever arm 31 of each lever 20 (one being shown) is connected in each instance by a pin 36 to a rigid link 37, said pin having a certain amount of play in its slotted mounting 38 in said lever and that the other end of said link is pivotally connected by a pin 39 with a bracket 40 welded to the frame member 6.

In both of the above-described constructions the introduction of pressure fluid through the pipe 41 into the cylinder 9 forces the piston 11 outwardly and through the rod 17 moves the crosshead 18 along the tracks 15, the levers 20 moving therewith. As these levers 20 are operated either the links 33 or 37 restrain their movement in one direction and thus cause their arms 23 to swing upwardly and this upward movement is transmitted through the thrust links 26 to the dumping body 29 beyond its pivotal mounting and thus causes the body to be tilted upwardly, as shown in dotted line in Figs. 2 and 3, to the desired dumping position, and the release of pressure fluid permits the parts to move back to their normal load-receiving position. In Figs. 1 and 2 the levers 20 are limited in their movement to tilting position by the stop-rod 16 located in their path and in Fig. 3 they are limited by the engagement of the pin 39 with the bracket 40 or its supporting frame 6. Furthermore, as the levers 20 and crosshead 18 move back and forth along the tracks 15 the lugs 22 on the levers 20 are free to slidably engage the inner edges of said tracks and thus prevent their distortion under load and maintain them in proper transverse alinement. In case it is desired to change the extent of the angle of tilt of the body, shifting the pin 25 to the hole 24 to the left, as seen in Figs. 2 and 3, increases the tilting angle of the body frame 29 from that shown and shifting said pin from the midposition shown to the right hand hole decreases the tilting angle of the dumping body from that shown without necessitating any change in the stroke of the crosshead 18. Furthermore, the lost-motion connection above described between the dumping body and the operating linkage prevents shocks from the body damaging the operating linkage, it being noted that in some instances where the track is not on level ground the body may be tilted somewhat to one side or the other, which would tend to bind the parts of the operating mechanism, and that the lost-motion connection herein provided eliminates this tendency.

I desire it to be understood that this invention is not to be limited to any specific arrangement of construction of parts except insofar as such limitations are included in the claims.

What I claim as my invention is:

1. In combination with a supporting frame having a dumping body pivotally mounted thereon, a tilting mechanism comprising a pair of intermedially pivoted levers, means for supporting the pivotal connections for said levers for longitudinal movement relative to said supporting frame, links connecting one of the arms of each lever to the dumping body, rigid links working below the said pivotal connections of said levers and operatively connecting the other arms of said levers with the supporting frame to cause the last mentioned arms of said levers to swing downwardly and then upwardly as said dumping body is moved to discharge position during their longitudinal movement, and means for moving the fulcrum points of both levers in unison.

2. In combination with a supporting frame having a dumping body pivotally mounted thereon, a tilting mechanism comprising a pair of intermedially pivoted levers, means for supporting the pivotal connections for said levers for longitudinal movement relative to said supporting frame, links connecting one of the arms of each lever to the dumping body, rigid links operatively connecting the other arms of said levers with the supporting frame, and means for moving the fulcrum points of both levers in unison, said first-named links having an adjustable connection with said levers for changing the angle of tilt of the dumping body without changing the extent of movement of the pivotal connections of said levers.

3. The combination with a supporting frame having a dumping body tiltably mounted thereon, a hoisting mechanism comprising an hydraulic cylinder mounted on the supporting frame, a crosshead, a piston in said cylinder having a piston-rod connected to said crosshead, said crosshead having shaft portions, levers pivotally mounted intermediate their ends on each of said shaft portions and having rearwardly and forwardly extending arms, rollers mounted on said shaft portions beyond said levers, tracks on the frame on which said rollers run, links pivotally connecting the forwardly extending arms of said levers to the dumping body, rigid links pivotally connecting the rearwardly extending arms of said levers to the supporting frame to control the pivotal movement thereof, and means on the levers engageable with the tracks to maintain the same in transverse alignment.

4. The combination with a supporting frame having a dumping body tiltably mounted thereon, a hoisting mechanism comprising an hydraulic cylinder mounted on the supporting frame, a crosshead, a piston in said cylinder having a piston-rod connected to said crosshead, said crosshead having shaft portions, levers pivotally mounted intermediate their ends of each of said shaft portions and having rearwardly and forwardly extending arms, rollers mounted on said shaft portions beyond said levers, tracks on the frame on which said rollers run, links pivotally connecting the forwardly extending arms of said levers to the dumping body, rigid links pivotally connecting the rearwardly extending arms of said levers to the supporting frame to control the pivotal movement thereof, means on the levers engageable with the tracks to maintain the same in transverse alignment, and stop means engageable with said levers for limiting the upward swinging movement of said levers.

5. In combination with a supporting frame having a dumping body pivotally mounted thereon, a tilting mechanism comprising a pair of intermedially pivoted levers, means for supporting the pivotal connections for said levers for longitudinal movement relative to said supporting frame, means connecting one of the arms of each lever to the dumping body, link means operatively connected to the other arms of said levers to cause the last mentioned arms of said levers to swing downwardly and then upwardly as said dumping body is moved to discharge position during their longitudinal movement, and means for moving the fulcrum points of both levers in unison.

6. The combination with a pivotally mounted dump body and a supporting frame, a tilting mechanism comprising an intermediately pivoted lever, means for supporting the pivotal connection for said lever for bodily movements relative to said supporting frame, means for operatively connecting one end of said lever to lift said body, link means connected to the other end of said lever to cause it to swing downward and then upward as its first mentioned end moves to discharge position, and means for moving the fulcrum point of said lever.

7. The combination with a pivotally mounted dump body and a supporting frame, a tilting mechanism comprising an intermediately pivoted lever, means for supporting the pivotal connection for said lever for bodily movements relative to said supporting frame, means for operatively connecting one end of said lever to lift said body, rigid link means connected to the other end of said lever to cause it to swing downward and then upward as its first mentioned end moves to discharge position and means for bodily moving the fulcrum point of said lever.

8. Tilting mechanism in accordance with claim 6 and stop means for limiting the swinging movement of said lever to a predetermined dumping position.

In testimony whereof, I affix my signature.

THOGER G. JUNGERSEN.